United States Patent
Scheer et al.

(10) Patent No.: US 10,321,310 B1
(45) Date of Patent: Jun. 11, 2019

(54) SECURE AUTHENTICATION OF MOBILE DEVICES USING SENSOR TRANSFER OF KEYING MATERIAL

(71) Applicant: Rockwell Collins, Inc., Cedar Rapids, IA (US)

(72) Inventors: James L. Scheer, Hiawatha, IA (US); Raymond A. Kamin, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 73 days.

(21) Appl. No.: 13/909,709

(22) Filed: Jun. 4, 2013

(51) Int. Cl.
*H04W 12/06* (2009.01)

(52) U.S. Cl.
CPC .................................. *H04W 12/06* (2013.01)

(58) Field of Classification Search
CPC ..... H04W 12/00; H04W 12/06; H04W 12/04; H04L 9/00; H04L 63/00
USPC .................................. 380/247–250; 455/411
See application file for complete search history.

(56) References Cited

U.S. PATENT DOCUMENTS

| | | | | |
|---|---|---|---|---|
| 8,745,718 B1* | 6/2014 | Dufel | .................. | H04L 63/0807 726/9 |
| 2005/0105527 A1* | 5/2005 | Vervust | ................. | H04L 12/189 370/390 |
| 2009/0205031 A1* | 8/2009 | Sato | ........................ | A63F 13/12 726/7 |
| 2010/0107185 A1* | 4/2010 | Shintani | ............. | H04N 21/4126 725/25 |
| 2010/0186074 A1* | 7/2010 | Stavrou | .................... | G06F 21/36 726/7 |
| 2010/0281261 A1* | 11/2010 | Razzell | ............... | H04L 63/0492 713/171 |
| 2012/0084571 A1* | 4/2012 | Weis | ........................ | G06F 21/34 713/184 |
| 2013/0013926 A1* | 1/2013 | Hakola | .................. | H04W 12/04 713/171 |
| 2013/0179842 A1* | 7/2013 | Deleris | ................. | G06F 3/0484 715/853 |

(Continued)

FOREIGN PATENT DOCUMENTS

WO   WO-2012043305 A1 *   4/2012   ............ H04W 76/10

OTHER PUBLICATIONS

Haverinen et al., Authentication and Key Generation for Mobile IP Using GSM Authentication and Roaming, Jun. 2001, IEEE International Conference on Communications records, pp. 2453-2457.*

(Continued)

*Primary Examiner* — Said M Elnoubi
(74) *Attorney, Agent, or Firm* — Angel N. Gerdzhikov; Donna P. Suchy; Daniel M. Barbieri

(57) ABSTRACT

A system and method are disclosed for use of a passive sensor within a mobile device as a separate authentication mechanism to exchange a secure key with a desired network. A network access point presents an encoded bit stream via an audio signal over an audio channel or a video signal within a video presentation. Each signal type is configured for reception by a passive sensor on the mobile device. This received information would be used to generate the private key within the mobile device for encrypting the wireless communication channel. Only mobile devices within audio or visual range of the presentation may be authenticated and thus securely connected to the network.

10 Claims, 5 Drawing Sheets

(56) References Cited

U.S. PATENT DOCUMENTS

2014/0169560 A1* 6/2014 Stotzer ................. H04W 12/02
                                                                                               380/270

OTHER PUBLICATIONS

Haverinen et al., Authentication and Key Generation for Mobile IP Using GSM Authentication and Roaming, Jun. 2001, IEEE International Conferencew on Communications records, pp. 2453-2457.*

Haverinen et al., "Athentication and key Generation for Mobile IP Using GSM Authentication and Routing", 2001, IEEE International Conference on Communications (ICC2001), pp. 2453-2457.*

* cited by examiner

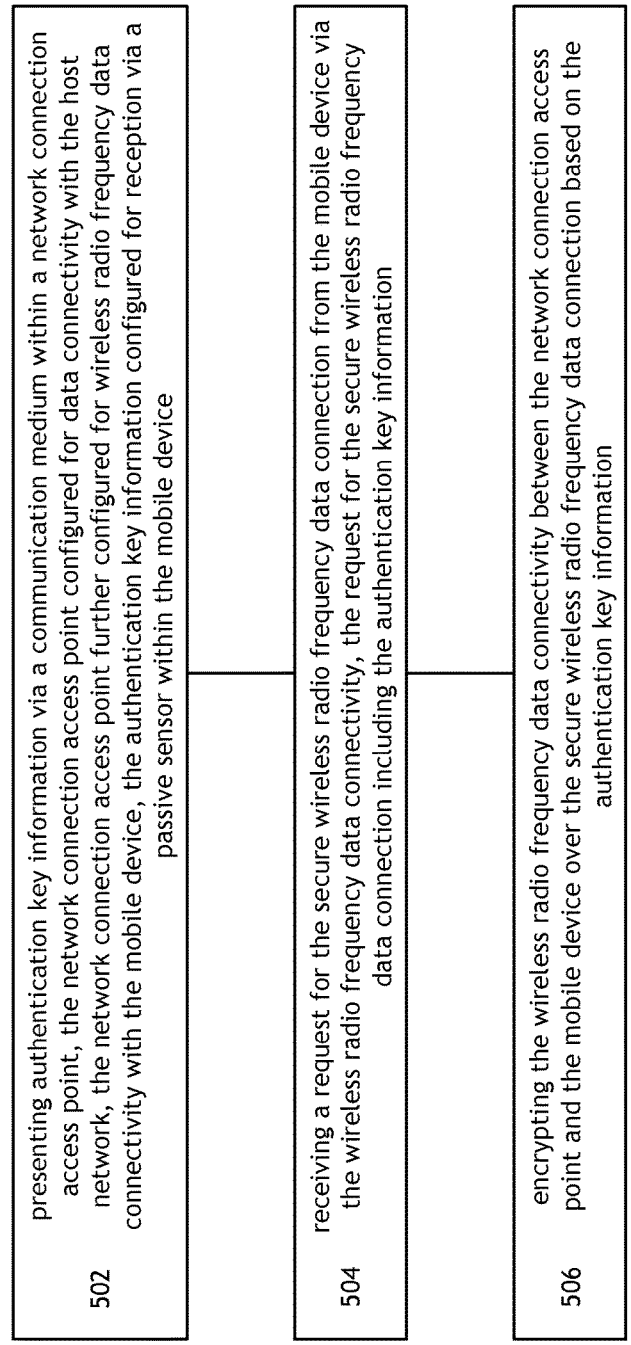

SECURE AUTHENTICATION OF MOBILE DEVICES USING SENSOR TRANSFER OF KEYING MATERIAL

FIELD OF THE INVENTION

The present invention relates generally to authentication of a wireless connection between a host network and a mobile device. More particularly, embodiments of the present invention relate to a system and method for automatic secure authentication of a mobile device wireless connection through transfer of keying information to the mobile device via a sensor located on the mobile device.

BACKGROUND OF THE INVENTION

Traditional authentication methods require a user to manually input an alphanumeric code into a mobile device before the mobile device is able to securely connect with a host network via a network access point. Current encryption methods such as Wired Equivalent Privacy (WEP), Wi-Fi Protected Access (WPA), Wi-Fi Protected Access II (WPA2), WPA2-Pre-Shared Key (PSK) and WPA2 Enterprise (ENT) modes may all suffer from a required user input of a key to enable the mobile device to securely connect with the host network. Some of these encryption methods employ a Temporal Key Integrity Protocol (TKIP) to ensure additional security with periodic refresh of the key material.

In addition, more securely connected devices using an Advanced Encryption Standard (AES) may allow secure transfer of information between a mobile device and a host network connection point.

Wireless signals may extend further than confines of the location in which desired secure communication may be hosted (e.g., transmitted). Signals designed to be local in nature which extend further than the desired range may be accessible by those other than the desired target audience.

The cumbersome requirement remains for each of these secure methods to manually exchange an alphanumeric key between the mobile device and the host network router to enable secure communications between the two. Consequently, a need exists for an effective method of local auto authentication of a mobile device desirous of engaging in secure communication with a host network via the network access point.

SUMMARY OF THE INVENTION

Accordingly, an embodiment of the present invention is directed to a method for automatic local authentication of a secure wireless radio frequency data connection between a mobile device and a host network. The method steps comprise presenting authentication key information via a communication medium within a network connection access point, the network connection access point configured for data connectivity with the host network, the network connection access point further configured for wireless radio frequency data connectivity with the mobile device, the authentication key information configured for reception via a passive sensor within the mobile device, receiving a request for the secure wireless radio frequency data connection from the mobile device via the wireless radio frequency data connectivity, the request for the secure wireless radio frequency data connection including the authentication key information, encrypting the wireless radio frequency data connectivity between the network connection access point and the mobile device over the secure wireless radio frequency data connection based on the authentication key information.

An additional embodiment of the present invention may provide the authentication key information communicated by an encoded bit stream transmitted within an audio signal, the audio signal configured of sufficient strength to remain within an enclosed space, the audio signal is further configured of a frequency to be imperceptible by a human.

An additional embodiment of the present invention may provide authentication key information communicated by one of: a single image presented on a display, a plurality of images presented on the display, a sequence of images, and a still image presented in tangible form and the display is a cockpit avionics display.

An additional embodiment of the present invention may provide a communication medium of one of: visually perceptible by a mobile device camera and aurally perceptible by a mobile device microphone.

An additional embodiment of the present invention may provide a request for the secure wireless radio frequency data connection from the mobile device via the wireless radio frequency data connectivity which further comprises one of an application configured within the mobile device and an extension to an operating system within the mobile device for receiving the authentication key information and requesting the secure wireless radio frequency data connection.

An additional embodiment of the present invention may provide a network connection access point configured as a wireless router connected to the host network and the host network is one of: an avionics network onboard an aircraft, a local area network, and a wide area network.

An additional embodiment of the present invention may provide a passive sensor configured as at least one of: a microphone, a camera, an infrared receiver, and a passive sensor.

An additional embodiment of the present invention includes a system for automatic local authentication of a secure wireless radio frequency data connection between a mobile device and a host network, comprising: a host network, a network connection access point configured for: presenting authentication key information via a communication medium, the authentication key information configured for reception via a passive sensor within the mobile device, connecting via data connectivity with the host network, connecting via wireless radio frequency data connectivity with a mobile device, receiving a request for the secure wireless radio frequency data connection from the mobile device via the wireless radio frequency data connectivity, the request for the secure wireless radio frequency data connection including the authentication key information, encrypting the wireless radio frequency data connectivity between the network connection access point and the mobile device over the secure wireless radio frequency data connection based on the authentication key information.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 5 is a flow diagram of a method for secure authentication of a mobile device using sensor transfer of keying material illustrative of an embodiment of the present invention.

DETAILED DESCRIPTION OF THE INVENTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention are directed to a system and related method for secure authentication of a mobile device using transfer of keying material through a passive sensor within the mobile device. Passive sensors employed by an embodiment of the resent invention may exemplarily include a microphone and a camera. However, skilled artisans will recognize additional passive sensors may function within the scope of the present invention.

Figure 1:
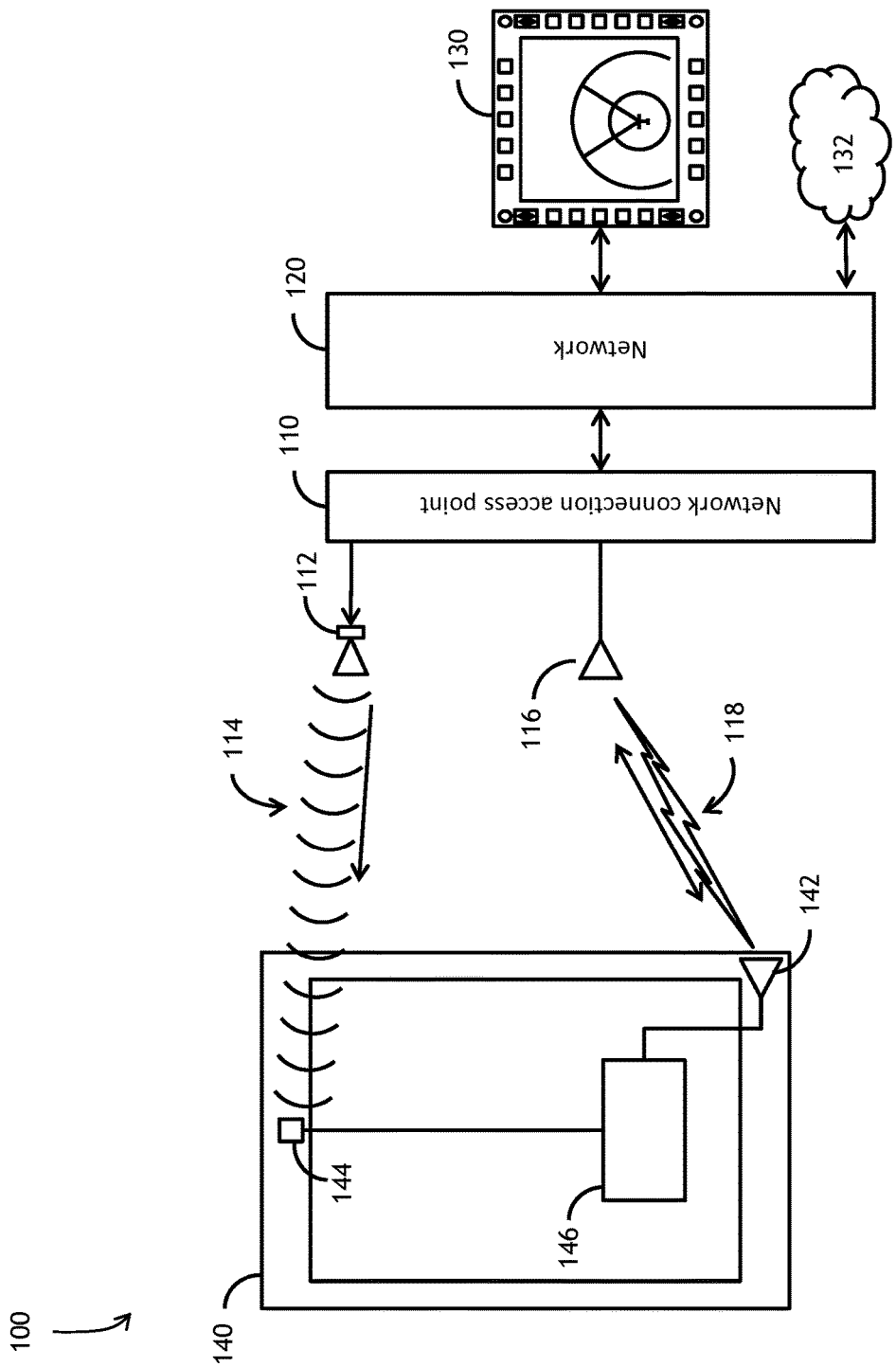
FIG. 1 is a diagram of a system for secure authentication of a mobile device using sensor transfer of keying material illustrative of an embodiment of the present invention.

Referring to FIG. 1, a diagram of a system for secure authentication of a mobile device using sensor transfer of keying material illustrative of an embodiment of the present invention is shown. Network connection access point 110 may be configured to connect with network 120 for data transfer. Network 120 transfers data between exemplary avionics unit 130 and additional network entities 132. It is contemplated herein network 120 may be a local area network, a network enclosed within an aircraft or office space, and a wide area network. For example, a network operating under a standard such as 802.11 b/g/n may function within the scope of embodiments disclosed herein.

One embodiment of the present invention may employ a built in microphone 144 on a mobile device 140 as a separate authentication mechanism to exchange a secure key with network 120 to which the mobile device may request secure wireless connectivity 118. In this case, the network connection access point 110 transmits an encoded bit stream over an audio channel 114 that is captured by the mobile device microphone 144. This key information would be used by mobile device processor 146 to generate the private key within the mobile device 140 for encrypting the secure wireless connectivity 118.

In operation, network connection access point 110 may transmit an audio signal 114 via an appropriate audio transmission device 112. One embodiment of the present invention may employ the use of a speaker as the audio transmission device 112 for transmission of the audio signal 114. Within the audio signal 114, system 100 transmits an audio sub channel containing authentication key information. The authentication key information contains the keying data required by network connection access point 110 for secure wireless connectivity 118 between network connection access point 110 and mobile device 140.

Mobile device 140 may possess a plurality of sensors. Exemplary sensors may include passive microphone 144 and active antenna 142. Passive microphone 144 may receive audio signals within a frequency range designed for the particular mobile device.

System 100 may transmit audio signal 114 in a frequency range perceptible and receivable by passive microphone 144 yet imperceptible by a human in the vicinity of the audio signal. For example, passive microphone 144 may be able to receive and process frequencies up to an exemplary 20 KHz while a human may only perceive (hearing and vibration) frequencies in the range from approximately 4 Hz to 20 KHz under ideal conditions. In embodiments, system 100 may generate and broadcast the audio signal 114 above the range of human hearing so no sound would be heard or felt by a human in the vicinity. System 100 may broadcast audio signal 114 at 20 KHz, outside the perception range of most humans while within the perception of many mobile devices.

It is contemplated herein; additionally frequencies for broadcast of audio signal 114 may function within the scope of the present invention. As mobile devices may evolve, additional frequency reception capability may allow system 100 to communicate the audio signal 114 with those mobile devices with enhanced frequency capability.

Within mobile device 140, mobile processor 146 may possess an operating system capable of the processing power to receive the audio signal 114 and determine from the received signal the appropriate authentication key information. Further, an extension to the operating system found in processor 146 may provide the system 100 required capabilities. Additionally, processor 146 may be configured with an application to make the determination. Such application may be transferrable from one mobile device to another mobile device and updated on a regular basis as improved capabilities may emerge.

Once mobile device processor 146 receives audio signal 114 via microphone 144, is may process the authentication key information and submit a request to network connection access point 110 for a secure wireless radio frequency data connection between the mobile device 140 and the network. This request may include all or part of the authentication key information received via the microphone 144.

Figure 2:
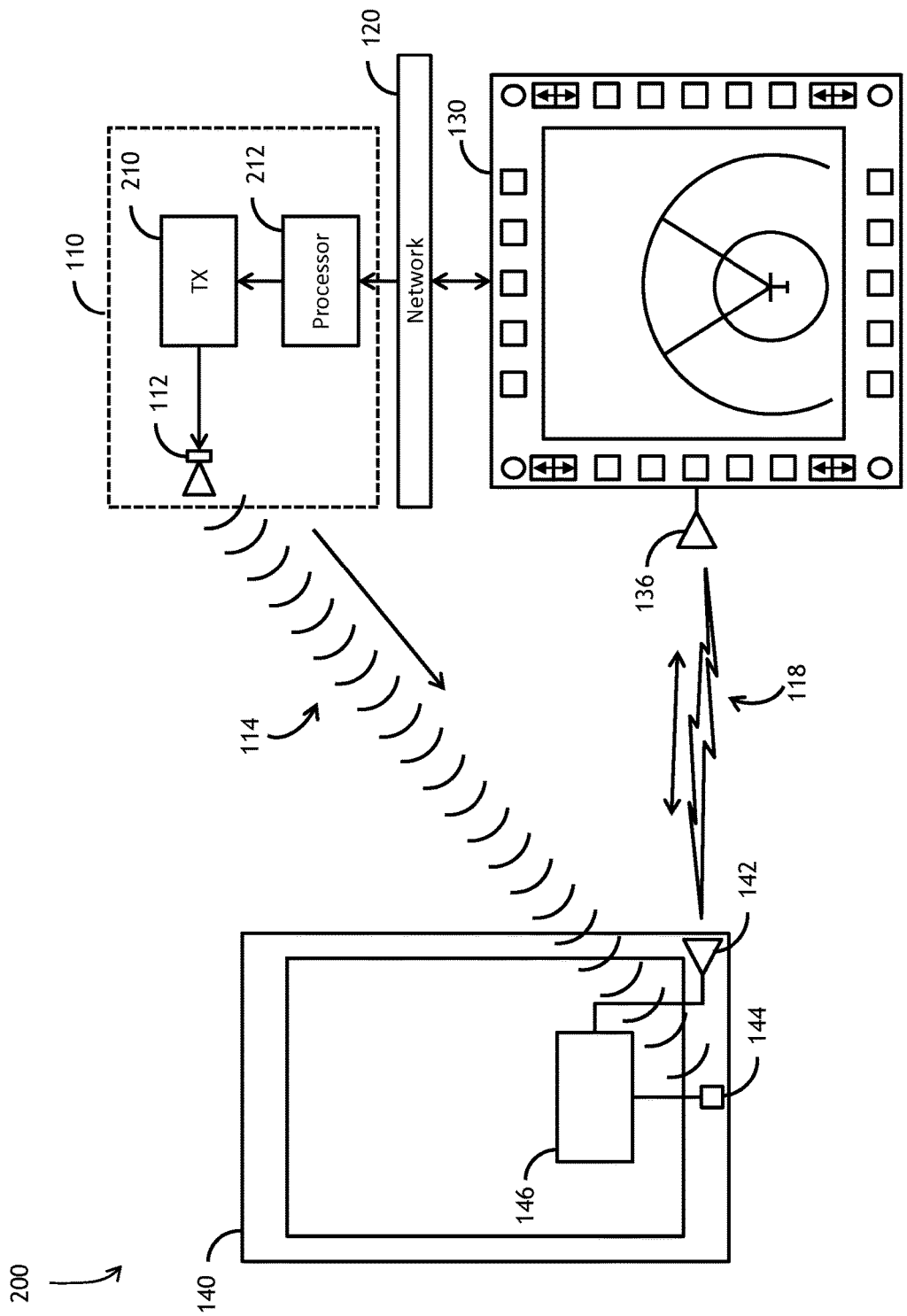
FIG. 2 is a diagram of a system for secure authentication of a mobile device using sensor transfer of keying material illustrative of an embodiment of the present invention.

Referring to FIG. 2, a diagram of a system for secure authentication of a mobile device using sensor transfer of keying material illustrative of an embodiment of the present invention is shown. Avionics unit 130 may be configured with wireless connectivity via antenna 136 for direct connectivity with a mobile device 140. As above, once system 200 sends the authentication key information via audio signal 114, the audio signal may be received by any mobile device within audible range.

Once a secure wireless connectivity 118 is established between mobile device 140 and network 120, system 200 may provide for additional information exchange between the two entities. For example, mobile device 140 may securely receive position information from an avionics network onboard an aircraft. It is contemplated herein; specific mobile devices may offer an updated navigation suite from that which exists within the onboard avionics. Such updated navigation suites may allow for additional capabilities not found within the onboard avionics. Additionally, the speed with which mobile device applications are updated may greatly exceed the speed with which operating systems incorporated within installed avionics or automobile software are updated. This greater speed may be leveraged by embodiments of the present invention to ease cockpit workload and aid in aviation and vehicle safety.

Vehicle safety may be enhanced through application of methods herein. For example, a traditional Control Display Unit (CDU) may allow for cumbersome data input through a set of alphanumeric keys. Embodiments of the present invention may allow for alternative data entry from the mobile device 140 to the CDU through the secure wireless connectivity 118. A less-busy crewmember may be able to input data to the avionics network 120 requested by a busy crewmember.

Figure 3:
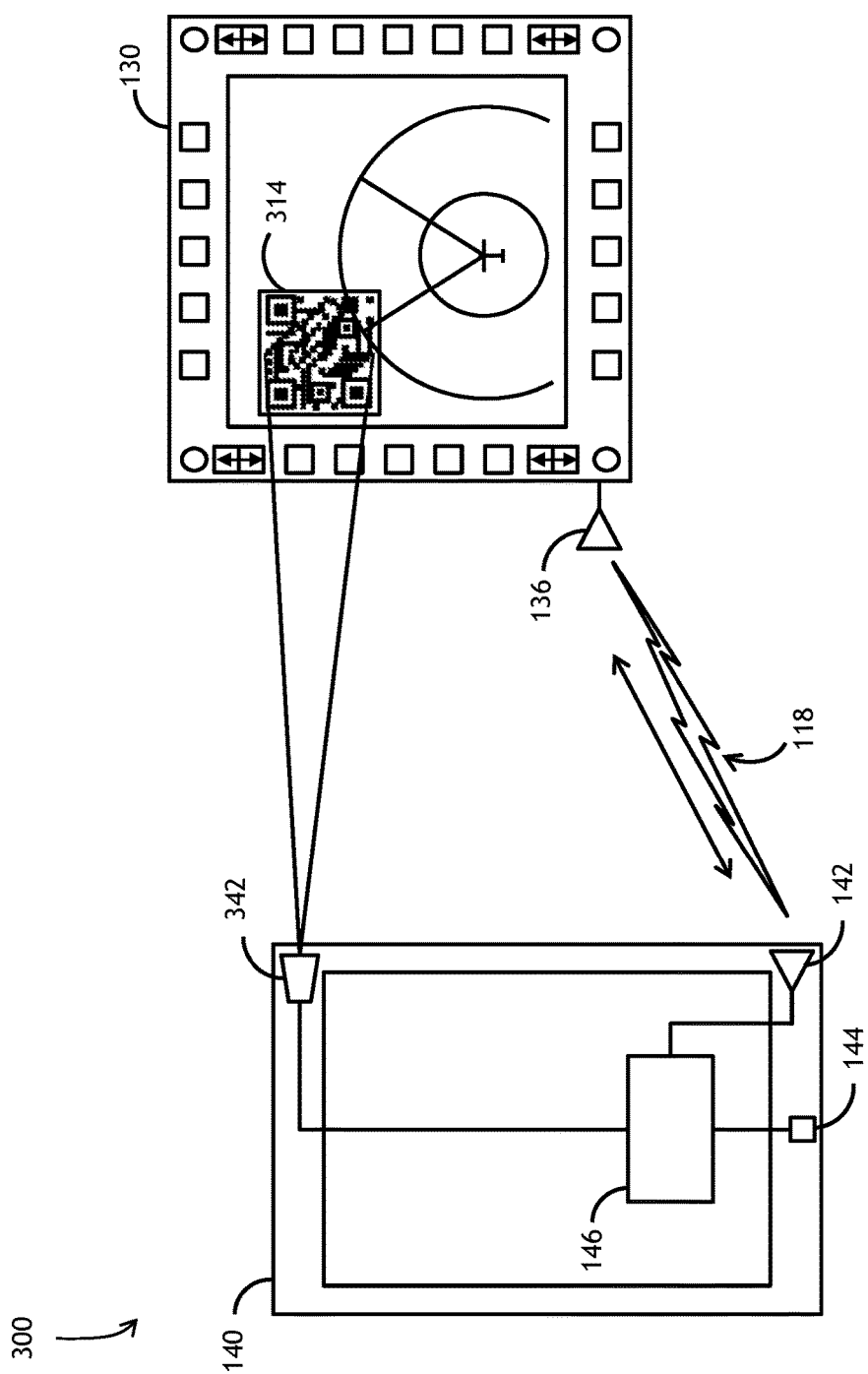
FIG. 3 is a diagram of a system for secure authentication of a mobile device using sensor transfer of keying material illustrative of an embodiment of the present invention.

Referring to FIG. 3, a diagram of a system for secure authentication of a mobile device using sensor transfer of keying material illustrative of an embodiment of the present invention is shown.

System 300 may employ the built in camera 342 on the mobile device 140 as a separate authentication mechanism to exchange a secure key with the flight deck avionics 130. In this case, the avionics 130 would render an image 314 such as alphanumeric code, graphic image such as a bar code, or sequence of images that would be captured by the mobile device camera 342. This information would be used to generate the private key within the mobile device 140 for encrypting the secure wireless connectivity 118.

In an additional embodiment, system 300 may provide additional maintenance functions associated with the vehicle systems. For example, a technician carrying a mobile device 140 may take a picture of an image 314 comprising a coded photograph within a compartment of the vehicle. The passively imaged photograph contains the secure key information necessary for secure wireless connectivity 118 between the mobile device 140 and the devices within the compartment. For example, an auto mechanic may use a tablet mobile device 140 to photograph an image 314 on a small display within the engine compartment of an automobile. This image 314 contains the secure key information and allows the tablet mobile device to securely and wirelessly connect with the network connection access point 110 onboard the automobile. This access may enable the mechanic to view history or troubleshoot potential problems with the automobile.

This position-based security may aid in information security assurance for operators using system 300. For example, a positional based video key may allow only those persons with physical access to the location (compartment) to gain secure access to the local network. For example, a pilot may have physical access to the cockpit of an aircraft. Therefore, the positional access may allow the pilot's mobile device 140 to receive the photographic key information within the image 314 and connect to the avionics network 120.

System 300 may provide for a dynamic key generation of each type of generated and presented media. For example, system 300 may present a dynamic video image 314 key based on desired security requirements. Similarly, system 200 may dynamically present an altered audio key. Exemplary dynamically changing keys every 20 seconds may allow for an operator to achieve a desired level of security. Alternatively, a key changing every month may suffice for a specific operator.

In addition, system 300 may allow for accountability of secure user with the local network. For example, a first user enters an office and receives an image with the camera of her mobile device. The first user's mobile device then securely connects with the network in the office via the key information found within the image providing the necessary encryption keys for the secure wireless session. The network may track the activity of the first user during the secure session. Each additional user may be identified and tracked as well based on the key information available to the specific user.

Figure 4:
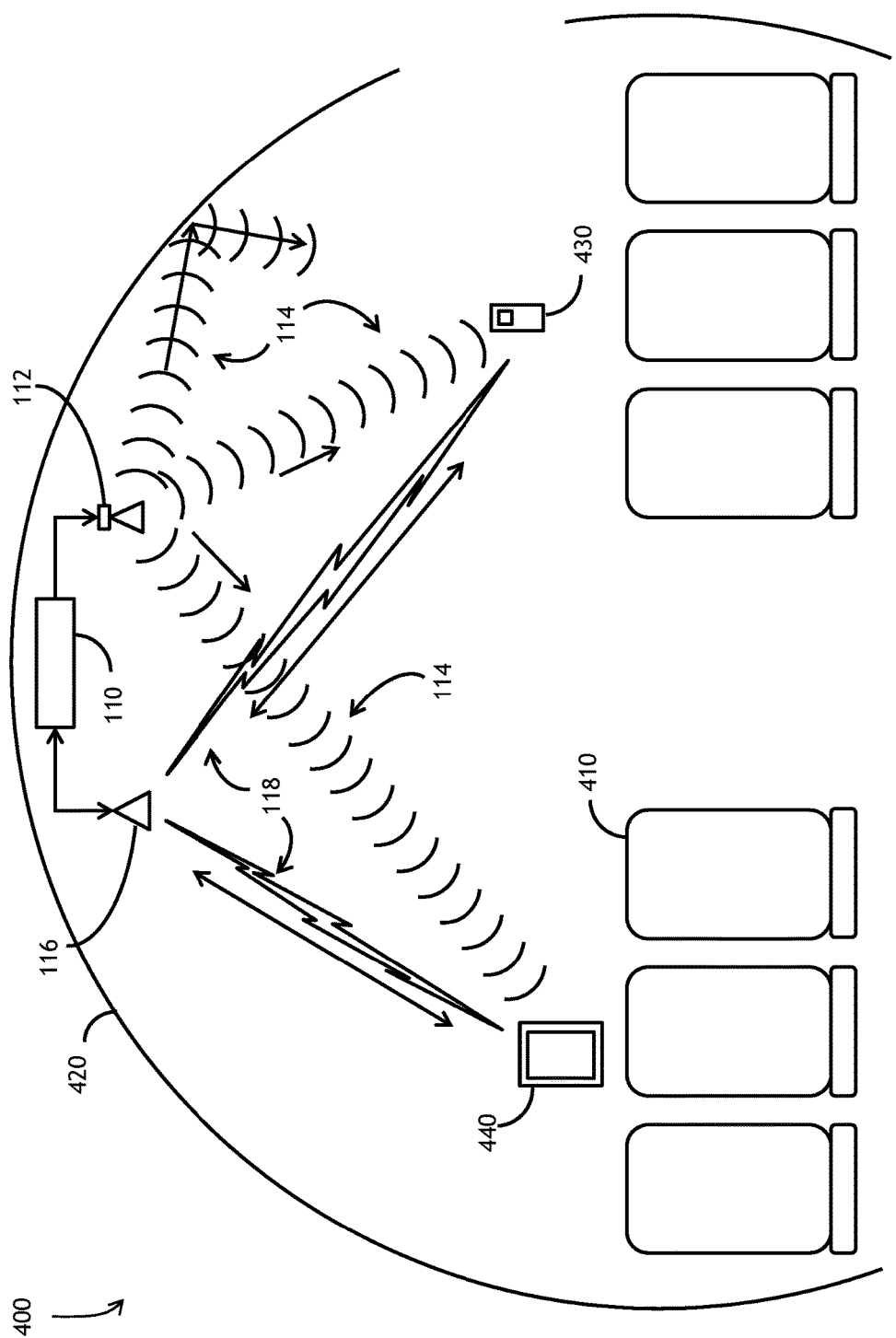
FIG. 4 is a diagram of a system for secure authentication of a mobile device using sensor transfer of keying material illustrative of an embodiment of the present invention.

Referring to FIG. 4, a diagram of a system for secure authentication of a mobile device using sensor transfer of keying material illustrative of an embodiment of the present invention is shown.

An additional embodiment of the present invention includes a transfer of session key information to passengers in seats 410 of an aircraft cabin that could then be used to allow the passengers to wirelessly access a local network onboard the aircraft. Passenger mobile devices 440, 430 may be target devices for which system 400 may be configured. For example, an in-flight entertainment (IFE) network may include content available to passengers. System 400 may allow the secure transfer of the desired content without compromise of the content to those outside the hull 420 of the aircraft. Only devices that are within audible range (e.g. inside the aircraft hull 420) would be able to receive the key information. This could be used to help prevent remote unauthorized access to a secure network by a device or intruder outside the hull 420.

Methods herein may provide additional forms of security for information assurance desired by operators. A power limited audio signal 114 key may allow only those persons within range of the audio signal 114 to gain secure access to the local network 120. For example, each passenger within the cabin of an aircraft may be within range of the audio signal 114 and, therefore, able to receive the audio key information and access the secure network 120. Additionally, as system 200 assigns a lifespan to a specific key and command a refresh of a key at a certain rate, only mobile devices within range of the new key may then maintain the secure connection.

Additionally, system 400 may provide for positional security using a video based security key in combination with system 300. For example, a video key may be presented to passengers via a seat back image or overhead display. Passengers' mobile devices 430, 440 may then connect to wireless network via secure wireless connectivity 118 with refreshed keys.

Referring to FIG. 5, a flow diagram of a method for secure authentication of a mobile device using sensor transfer of keying material illustrative of an embodiment of the present invention is shown. Method 500 begins at step 502 with presenting authentication key information via a communication medium within a network connection access point, the network connection access point configured for data connectivity with the host network, the network connection access point further configured for wireless radio frequency data connectivity with the mobile device, the authentication key information configured for reception via a passive sensor within the mobile device; and at step 504, with receiving a request for the secure wireless radio frequency data connection from the mobile device via the wireless radio frequency data connectivity, the request for the secure wireless radio frequency data connection including the authentication key information; method 500 concludes at step 506 with encrypting the wireless radio frequency data connectivity between the network connection access point and the mobile device over the secure wireless radio frequency data connection based on the authentication key information.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for establishing a secure data connection, comprising:
    presenting or transmitting, using a first communication medium, audio authentication key information from a network connection access point of a host network to a mobile device, the audio authentication key information comprising a private key or information for generating the private key for a secure data connection, wherein the audio authentication key information comprises first authentication key information;
    presenting second authentication key information, wherein the second authentication key information is communicated from the network connection access point to the mobile device using a sequence of images presented on a display;
    receiving, using a passive sensor of the mobile device, the audio authentication key information from the first communication medium, the receiving comprising a one-way communication, the mobile device further configured for two-way communication between the network connection access point and the mobile device using a second communication medium, the second communication medium separate or distinct from the first communication medium;
    sending, using the second communication medium, a request for the secure data connection from the mobile device, the sending occurring upon receipt of the audio authentication key information and upon obtaining of the private key using the mobile device, the request including the private key to connect the mobile device with the host network over the secure data connection;
    encrypting, using the private key, data communicated between the network connection access point and the mobile device to establish the secure data connection; and
    tracking an activity of a user through the mobile device during use of the secure data connection,
    wherein the first communication medium is configured for transmission of an audio signal, the audio authentication key information is communicated from the network connection access point to the mobile device using an encoded bit stream transmitted within the audio signal, and the audio signal has a frequency of 20 KHz or more,
    wherein the host network is an avionics network onboard an aircraft,
    wherein receiving, using a passive sensor of the mobile device, the audio authentication key information further comprises receipt of the audio authentication key information by a microphone from a power limited audio signal.

2. The method of claim 1, wherein the first authentication key information is communicated using the first communication medium, the first communication medium comprises an audio signal transmitted to a microphone of the mobile device, the passive sensor comprising the microphone, and wherein different authentication key information of the first authentication key information and the second authentication key information is interchangeably transmitted or presented after a time interval.

3. The method of claim 1, wherein receiving, using a passive sensor of the mobile device, the audio authentication key information further comprises using a processor and an application of the mobile device to determine the private key from the audio authentication key information.

4. The method of claim 3, wherein an extension to an operating system of the processor provides at least in-part a capability for the determining of the private key.

5. The method of claim 1, wherein the network connection access point is a wireless router connected to the host network.

6. A system for establishing a secure data connection, comprising:
    a host network;
    a network connection access point configured for:
    presenting or transmitting audio authentication key information to a passive sensor of a mobile device using a first communication medium, the audio authentication key information comprising a private key or information for generating the private key for a secure data connection, wherein the audio authentication key information comprises first authentication key information;
    presenting second authentication key information, wherein the second authentication key information is communicated from the network connection access point to the mobile device using a sequence of images presented on a display;
    connecting the host network with the mobile device using a second communication medium, the second communication medium being separate or distinct from the first communication medium a, wherein the separation or distinction at least comprises being configured for two-way communication;
    receiving a request for the secure data connection from the mobile device upon receipt at the mobile device of the authentication key information and upon obtaining of the private key using the mobile device, the request including the private key to connect the mobile device with the host network over the secure data connection, the receiving the request using the second communication medium; and
    encrypting data communicated between the network connection access point and the mobile device using the private key to establish the secure data connection,
    wherein the host network is configured to track an activity of a user through the mobile device during use of the secure data connection, wherein the first communication medium is configured for transmission of an audio signal, the audio authentication key information is communicated from the network connection access point to the mobile device using an encoded bit stream transmitted within the audio signal, and the audio signal has a frequency of 20 KHz or more, wherein the host network is an avionics network onboard an aircraft, wherein the mobile device is configured for passive reception, the passive reception comprising receiving the audio authentication key information using the passive sensor of the mobile device and further comprising positional-based or vicinity-based reception of the audio authentication key information within an aircraft hull, and wherein the aircraft hull and a range of the first communication medium separates the audio authentication key information from receivers outside the aircraft hull.

7. The system of claim 6, wherein the first authentication key information is communicated using the first communication medium by an audio signal transmitted to a microphone of the mobile device, the passive sensor comprises the microphone, and different or altered authentication key information of the first authentication key information and the second authentication key information is interchangeably presented or transmitted after a time interval.

8. The system of claim 6, wherein the mobile device is configured for using a processor and an application of the mobile device for receiving the audio authentication key information and requesting the data connection.

9. The system of claim 6, wherein an extension to an operating system within the mobile device provides at least in-part a capability for the determining of the private key from the audio authentication key information.

10. An apparatus for establishing a secure data connection between a mobile device and a host network, comprising:
 a network connection access point associated with an aircraft and configured for:
 presenting first and second authentication key information to a mobile device within the aircraft using a first communication medium and a second communication medium, the first authentication key information comprising a first private key or first information for generating the first private key for a secure data connection and the second authentication key information comprising a second private key or second information for generating the second private key for the secure data connection, the presenting a one way communication to the mobile device through the first communication medium using an auditory signal and through the second communication medium using a sequence of images presented on a display;
 connecting the host network with the mobile device using a third communication medium, the third communication medium being separate or distinct from the first communication medium and the second communication medium;
 receiving a first request for the secure data connection from the mobile device upon receipt of the first authentication key information at the mobile device and upon obtaining of the private key using the mobile device, the receiving the first request using the third communication medium, the first request including the first private key;
 receiving a second request for the secure data connection from the mobile device upon receipt of the second authentication key information at the mobile device and upon obtaining of the private key using the mobile device, the receiving the second request using the third communication medium, the second request including the second private key; and
 encrypting data communicated between the network connection access point and the mobile device over the secure data connection using at least one of the first private key and the second private key,
wherein the host network is configured to track an activity of a user through the mobile device during use of the secure data connection,
wherein the first communication medium is configured for transmission of an audio signal, the audio authentication key information is communicated from the network connection access point to the mobile device using an encoded bit stream transmitted within the audio signal, and the audio signal has a frequency of 20 KHz or more,
wherein the host network is an avionics network onboard an aircraft,
wherein the mobile device is configured for passive reception, the passive reception comprising receiving the audio authentication key information using the passive sensor of the mobile device and further comprising positional-based or vicinity-based reception of the audio authentication key information within an aircraft hull, and wherein the aircraft hull and a range of the first communication medium separates the audio authentication key information from receivers outside the aircraft hull.

* * * * *